United States Patent
Barak et al.

(10) Patent No.: US 8,966,573 B2
(45) Date of Patent: *Feb. 24, 2015

(54) SELF-GENERATION OF VIRTUAL MACHINE SECURITY CLUSTERS

(75) Inventors: Nir Barak, Yosef (IL); Itzhak Fadida, Silver (IL); Eitan Hadar, Nesher (IL)

(73) Assignee: CA, Inc., New York, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/554,559

(22) Filed: Jul. 20, 2012

(65) Prior Publication Data

US 2014/0026231 A1    Jan. 23, 2014

(51) Int. Cl.
*G06F 21/00* (2013.01)

(52) U.S. Cl.
USPC .......... 726/1; 726/14; 726/29; 709/224; 718/1

(58) Field of Classification Search
CPC . G06F 21/6218; G06F 9/45533; G06F 9/455; G06F 9/45558; H04L 63/20
USPC .......... 726/14, 25, 29, 1–7, 30; 718/1; 709/224, 225
See application file for complete search history.

(56) References Cited

U.S. PATENT DOCUMENTS

| | | | |
|---|---|---|---|
| 8,250,638 B2* | 8/2012 | Singh et al. | 726/6 |
| 2002/0010917 A1 | 1/2002 | Srikantan et al. | |
| 2005/0257099 A1 | 11/2005 | Bounkong et al. | |
| 2006/0031463 A1* | 2/2006 | Bird et al. | 709/224 |
| 2008/0046960 A1* | 2/2008 | Bade et al. | 726/1 |
| 2010/0071035 A1* | 3/2010 | Budko et al. | 726/4 |
| 2010/0217850 A1* | 8/2010 | Ferris | 709/223 |
| 2010/0333165 A1* | 12/2010 | Basak et al. | 726/1 |
| 2011/0016467 A1* | 1/2011 | Kane | 718/1 |
| 2011/0072486 A1* | 3/2011 | Hadar et al. | 726/1 |
| 2011/0191834 A1 | 8/2011 | Singh et al. | |
| 2011/0296488 A1* | 12/2011 | Dandekar et al. | 726/1 |
| 2012/0036581 A1 | 2/2012 | Maximilien et al. | |
| 2013/0019277 A1* | 1/2013 | Chang et al. | 726/1 |
| 2013/0055337 A1* | 2/2013 | Choi et al. | 726/1 |
| 2013/0263208 A1* | 10/2013 | Challa | 726/1 |
| 2013/0291052 A1* | 10/2013 | Hadar et al. | 726/1 |
| 2013/0305311 A1* | 11/2013 | Puttaswamy Naga et al. | 726/1 |
| 2014/0019617 A1* | 1/2014 | Hadar | 709/225 |

OTHER PUBLICATIONS

Shengmei Luo et al, Virtualization security for cloud computing service, IEEE, 2011.*
Luo et al., "Virtualization security for cloud computing service", *2011 International Conference on Cloud and service Computing, 2011 IEEE*, 174-179.

* cited by examiner

*Primary Examiner* — Shewaye Gelagay
*Assistant Examiner* — Shanto M Abedin
(74) *Attorney, Agent, or Firm* — Myers Bigel Sibley & Sajovec, P.A.

(57) ABSTRACT

A method of operating a virtual computing system includes receiving at a security controller security data corresponding to a candidate virtual machine that is proposed to be included in a virtualization environment managed by a virtualization environment manager, comparing the security data of the candidate virtual machine to security data of other virtual machines in the virtualization environment, and in response to the comparison, recommending that the virtualization environment manager exclude the candidate virtual machine from the virtualization environment. Related systems and computer program products are disclosed.

15 Claims, 4 Drawing Sheets

SELF-GENERATION OF VIRTUAL MACHINE SECURITY CLUSTERS

BACKGROUND

The present disclosure relates to computing systems, and in particular to maintaining the security of computing systems in virtual operating environments.

Virtualized computing environments, also referred to as cloud computing systems, are used to provide computing resources to end users. In a cloud computing environment, the physical hardware configuration is hidden from the end user. Cloud computing systems may include servers, network storage devices, routers, gateways, communication links, and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Because cloud computing treats computing resources as remote services that are accessed by customers, and because the actual physical resources that are used to implement a cloud computing environment may be accessed by many different customers, security is an important aspect of cloud computing.

Many different technologies have been developed to prevent security breaches in computing systems. For example, the physical security of computing systems can be addressed by locating the computing systems in a secure facility. Communication links can be encrypted or secured to prevent eavesdropping on communications with computing resources. Application programs and databases can be secured using authentication protocols to prevent unauthorized access.

Many security systems and procedures have an overhead cost associated with their use. For example, encrypting and decrypting communications requires time and computing resources, particularly for high volume communications. A system designer must therefore make a tradeoff between the level of security required for the system and the amount of overhead expense that can be tolerated. Depending on the sensitivity of the application, computing systems can be provided with varying levels of security.

In a cloud computing environment, different customers may have different security requirements. Hosting applications that have different security requirements in a single cloud computing system may raise additional security issues, however. For example, when highly secured systems are hosted along with lower security systems, an attacker may attempt to leverage the lower security system to gain access to the highly secured systems.

BRIEF SUMMARY

A server system according to some embodiments includes a virtualization environment manager configured to manage a virtualization environment in which virtual machines can be deployed, and a security controller. The security controller is configured (i) to receive security data corresponding to a candidate virtual machine that is proposed to be included in the virtualization environment, (ii) to compare the security data corresponding to the candidate virtual machine to security data corresponding to other virtual machines in the virtualization environment, and (iii) in response to the comparison, to transmit a message to the virtualization environment manager that recommends the candidate virtual machine be excluded from the virtualization environment. The security data corresponding to the candidate virtual machine may include a security policy and/or a sensitivity level of the candidate virtual machine.

The security controller may include a monitor component that is configured to monitor the security data corresponding to the virtual machines in the virtualization environment.

The security controller may include a controller component that is configured to generate a metric in response to security data provided by the monitor component that compares the security data corresponding to the candidate virtual machine to security data corresponding to of each of the virtual machines in the virtualization environment.

The controller component may be configured to recommend excluding the candidate virtual machine from the virtualization environment if the security data corresponding to the candidate virtual machine differs from the security data corresponding to the remaining virtual machines in the virtualization environment by an average amount that is greater than a predefined threshold amount.

The controller component may be configured to recommend excluding the candidate virtual machine from the virtualization environment if the security data corresponding to the candidate virtual machine differs from the security data corresponding to any of the remaining virtual machines in the virtualization environment by an amount that is greater than a predefined threshold amount.

The metric may evaluate a difference between a first security policy and a second security policy based on at least one of (i) a number of identical entries in the first and second policies (ii) a difference in the sizes of the security policies, and (iii) a difference in order of appearance of entries in the first and second security policies.

The candidate virtual machine may include a virtual machine that is proposed to be added to the virtualization environment.

The candidate virtual machine may include a virtual machine in the virtualization environment having security data that has changed.

The security controller may be further configured to compare the security data corresponding to the candidate virtual machine to the security data corresponding to other virtual machines in a cluster defined in the virtualization environment, and in response to the comparison, to transmit a message recommending that the virtualization environment manager include the candidate virtual machine in the cluster.

The security controller may be further configured to identify a target virtualization environment to which the virtual machine can be moved in response to determining that the candidate virtual machine should be excluded from the virtualization environment.

Some embodiments are directed to a method of operating a virtual computing system that includes receiving at a security controller security data corresponding to a candidate virtual machine that is proposed to be included in the virtualization environment, comparing the security data corresponding to of the candidate virtual machine to security data corresponding to other virtual machines in the virtualization environment, and in response to the comparison, transmitting a message recommending that the virtualization environment manager exclude the candidate virtual machine from the virtualization environment.

Comparing the security policy of the candidate virtual machine to the security policies of other virtual machines in the virtualization environment may include generating a metric that compares the security data corresponding to the candidate virtual machine to the security data corresponding to each of the virtual machines in the virtualization environment.

The method may further include recommending that the virtualization environment manager exclude the candidate virtual machine from the virtualization environment if the security data corresponding to the candidate virtual machine differs from the security data corresponding to the remaining virtual machines in the virtualization environment by an average amount that is greater than a predefined threshold amount.

The method may further include recommending that the virtualization environment manager exclude the candidate virtual machine from the virtualization environment if the security data corresponding to the candidate virtual machine differs from the security data corresponding to any of the remaining virtual machines in the virtualization environment by an amount that is greater than a predefined threshold amount.

Some embodiments are directed to a computer program product for operating a virtual computing system. The computer program product includes a tangible, non-transitory computer readable storage medium having computer readable program code embodied in the medium. The computer readable program code includes computer readable program code configured to receive, at the security controller, security data corresponding to a candidate virtual machine that is proposed to be included in the virtualization environment, computer readable program code configured to compare the security data corresponding to the candidate virtual machine to the security data corresponding to other virtual machines in the virtualization environment, and computer readable program code configured to transmit a message to the virtualization environment manager that recommends excluding the candidate virtual machine from the virtualization environment in response to the comparison.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
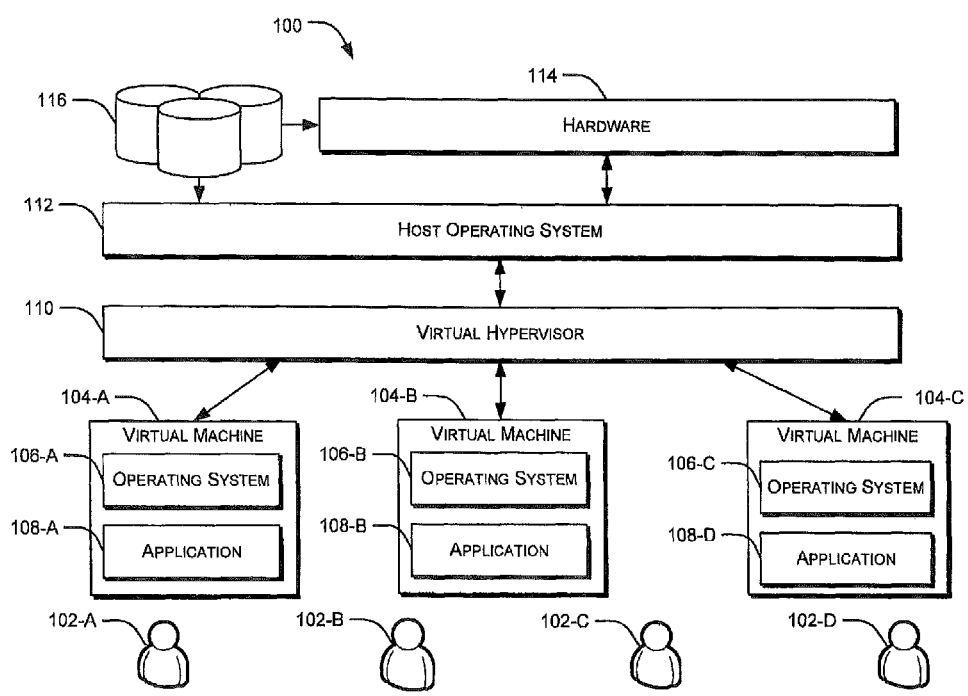
FIG. 1 is a block diagram of a computing system that supports a virtual operating environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an exemplary server system 100 for a virtualized computing environment in which the subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), handheld computer, mobile computing platform, server, or any other appropriate computer hardware. The hardware platform 114 may include computing resources such as a central processing unit (CPU); networking controllers; communication controllers; a display unit; a program and data storage device; memory controllers; input devices (such as a keyboard, a mouse, etc.) and output devices such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), read only memory (ROM) or any other suitable memory device. According to the illustrated embodiment, the host operating system 112 stands between the hardware platform 114 and the users 102 and is responsible for the management and coordination of activities and the sharing of the computing resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it has exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machine 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating system 106. In fact, the virtual hypervisor 110 merely maps the guest operating system's priority level to a priority level lower than the top most priority level. As a result, the virtual hypervisor 110 can intercept the guest operating system 106, executing instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Figure 2A:
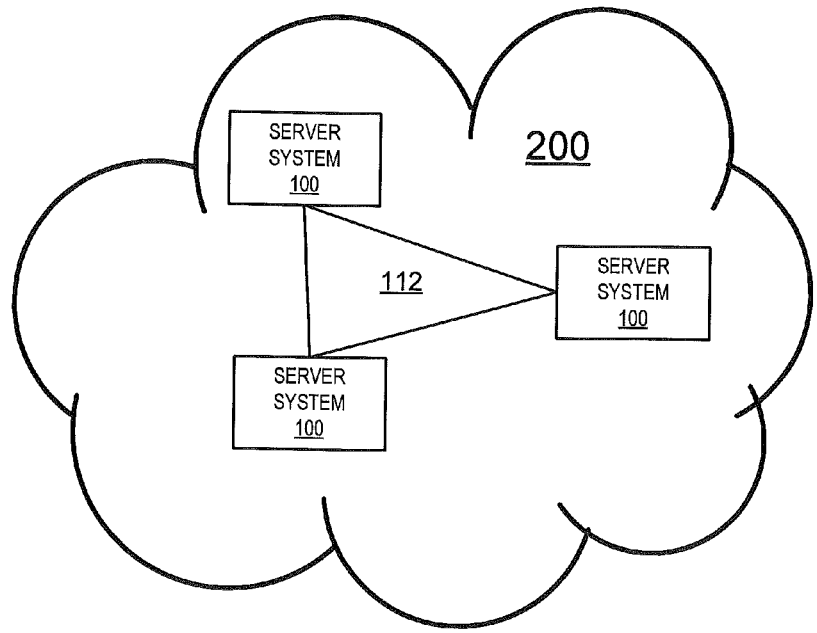
FIGS. 2A-2B illustrate a cloud computing environment.

Referring to FIG. 2A, a virtual computing environment 200 (referred to generally as cloud 200) may include one or more server systems 100 that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems", it will be appreciated that any suitable computing device may be used.

Figure 2B:
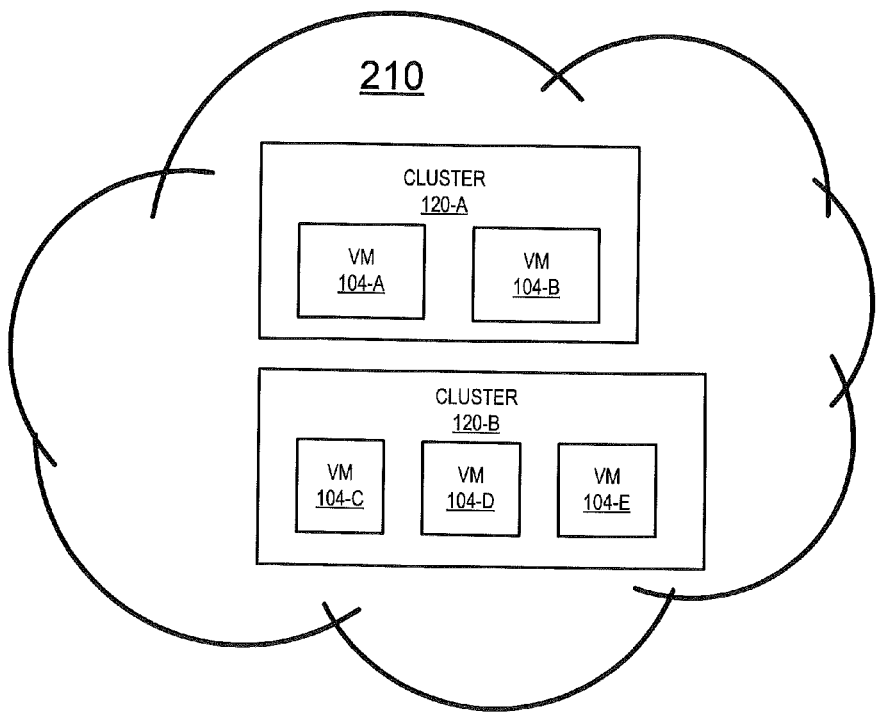

While FIG. 2A illustrates a physical configuration of servers within a cloud 200, FIG. 2B illustrates a logical grouping of virtual machines 104 within a virtualization environment 210 that may exist within the cloud 200. As shown therein, virtual machines 104 in a virtualization environment 210 can be organized and managed in clusters 120. A virtualization environment 120 can be managed by a single hypervisor 110, or a set of hypervisors 110. A group of related hypervisors is referred to herein as a "grid."

Virtual machines can be deployed in particular virtualization environments and organized to increase the efficiency of operating and/or managing a virtual computing environment. For example, virtual machines may be grouped into clusters in order to provide load balancing across multiple servers.

Virtual machines within a same cluster or virtualization environment can be managed by a single virtualization environment manager 250 to have same or similar resource access privileges (e.g., processor utilization, priority, memory allocation, communication interface access privileges, etc.), while virtual machines within different clusters or virtualization environments can have different resource access privileges.

Virtual machines that are deployed within a single virtualization environment may share physical resources within a server 100. For example, virtual machines that are deployed within a single virtualization environment 210 may share physical memory, storage, communication facilities and other resources or services of a server 100. Whenever computing resources are shared, there is the possibility that one virtual machine could intentionally or unintentionally gain access to data of another virtual machine.

When deploying virtual machines in a cloud computing environment, virtual machines from different customers, virtual machines having different sensitivity levels, and/or virtual machines different security levels may all sharing the same hypervisors or virtualization environments. Some embodiments may help to ensure that virtual machines having incompatible security or sensitivity levels are not deployed together.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines.

In performing their tasks, the server automation/provisioning tools typically consider server capacity and availability issues, and may consider pre-deployment security issues. However, these systems may not necessarily monitor ongoing dynamic changes to the security profile of a cloud system. In particular, these systems may not be configured to detect, analyze and/or respond to emerging risks in a cloud computing environment. In addition, server automation/provisioning tools are typically developed with a "design first" approach, and may not be well suited for adjusting to changes in security level or security risks.

As noted above, one issue that can raise a potential security risk is the co-location of high and low risk security systems in a single virtualization environment, where the low security system can act as a back door that is used to attack the high security system. For example virtual machines that can hold payment card industry (PCI) compliance data, and have such a compliance rating, should not share a hypervisor or environment with virtual machines that are not PCI compliant.

When deploying a new application in a virtualization environment, or when modifying an application in a virtualization environment, it is possible that other applications in the same virtualization environment will become more at risk if the security controls on the application are too low.

For improving security levels and/or trust levels within a cloud environment, it may be desirable to group systems having similar security levels in the same virtualization environment, even if such grouping results in a non-optimized deployment environment from a load, capacity or other standpoint. Furthermore, it may be desirable to reduce the grouping of systems having different security levels as much as possible. It may also be desirable to provide a virtual operating environment in which rapid security policy patches can be applied to similar virtual machines having similar security policies.

Some embodiments add security and threat sensitivity information and constraints to a virtual machine automation and provisioning tools that manage the operation of virtual machines. This can help to ensure that virtual machines having similar security sensitivity levels are deployed together, whether in the same virtualization environment or the same cluster. This may help to ensure segmentation of virtual machines by security level in addition to business and architecture constraints.

Systems/methods according to some embodiments may cause a virtualization environment manager, which is the system that assigns the virtual machines to clusters, to consider the security and sensitivity level of the virtual machines when assigning virtual machines to clusters. In addition, in systems that may have multiple automation and deployment controllers that handle the actual deployment of virtual machines for the virtualization environment manager, these systems/methods may alert the virtualization environment manager of a potential mismatch in security levels, and may also suggest an alternative secured location when an issue is identified.

When these system/methods are deployed in an existing production environment, they may initiate gradual changes by comparing security levels of the virtual machines with one another, detecting similarities/differences in the security policies, and suggesting membership assignments for security clusters (based on similarity of security policies, for example). These systems/methods may also start to proactively suggest alternative deployment locations to the virtual machine automation tools, according to security level similarity in each cluster.

These systems/methods may be implemented in an virtual machine security adjustment tool, referred to herein as a security controller, that may be implemented as part of an access control system for a virtual computing environment.

Figure 3:
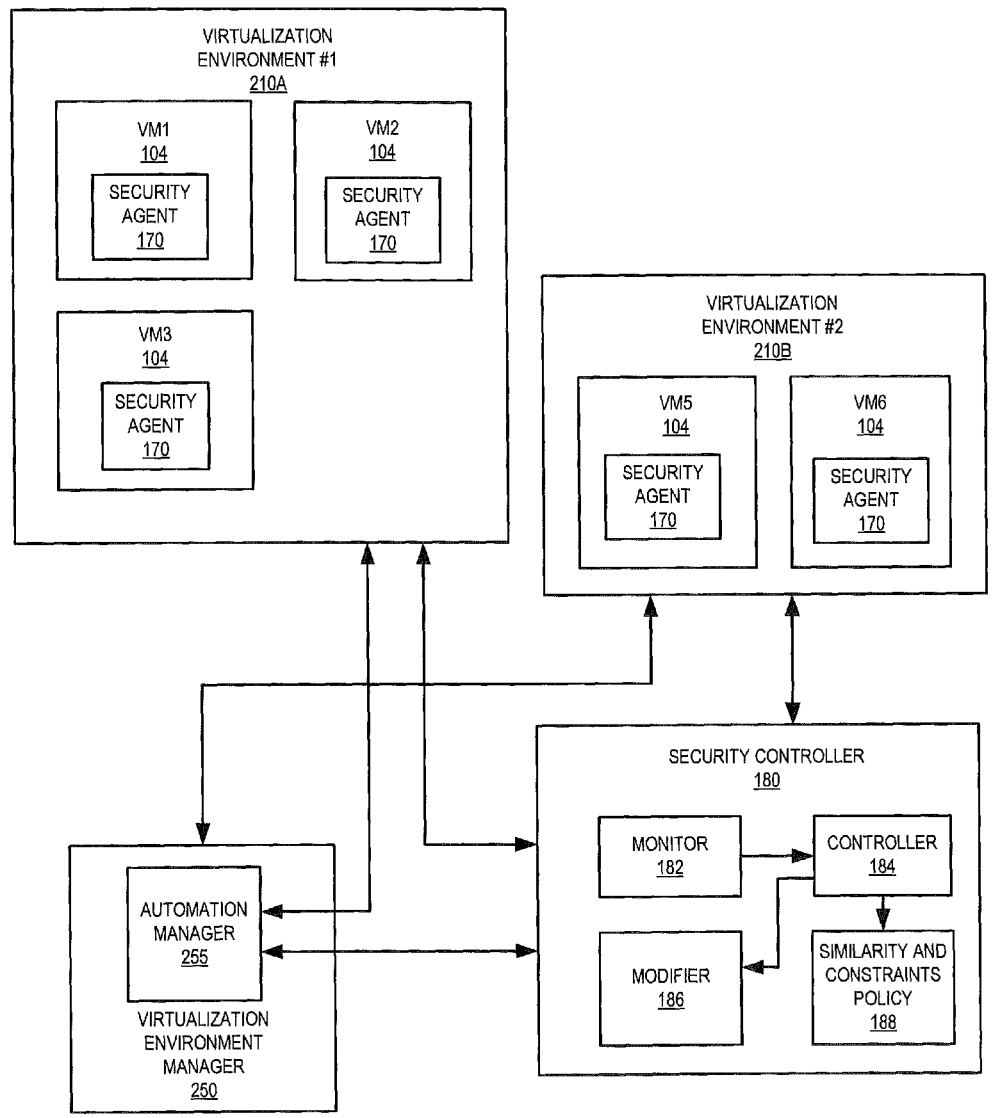
FIG. 3 illustrates a system according to some embodiments including a security controller and a plurality of virtualization environments.

Referring to FIG. 3, an exemplary system includes two virtualization environments 210A, 210B in which a plurality of virtual machines 104 are deployed. In the example illustrated in FIG. 3, virtual machines VM1, VM2 and VM3 are deployed in a first virtualization environment 210A, while virtual machines VM4 and VM5 are deployed in a second virtualization environment 210B. Each of the virtual machines includes a security agent 170 that stores, monitors and controls a security policy of the virtual machine.

A virtualization environment manager 250 manages the virtualization environments 210A, 210B. In particular, the virtualization environment manager 250 include an automation manager 255 that controls the assignment/reassignment of virtual machines 104 to particular virtualization environments 210 and/or clusters 120. The virtualization environment manager 250 may be provided external to the virtualization environments 210 for which it is responsible.

Also illustrated in FIG. 3 is a security controller 180. According to some embodiments, the security controller 180 may monitor the security policies of virtual machines 104 within a virtual computing environment 210 and develop recommendations that can be provided to a virtualization environment manager 250 for moving virtual machines 104 out of a virtualization environment 210 when the security policy of the virtual machine 104 is not compatible with the security policies of other virtual machines 104 in the virtualization environment 210. The security controller 180 may also make a recommendation to the virtualization environment manager 250 for where to locate virtual machines 104 when they are removed from a virtualization environment 210 because of security policy incompatibility.

The security controller 180 may include a monitor component 182, a controller component 184, a modifier component 186 and a similarity and constraints policy component 188. Briefly, the monitor component 182 gathers information relating to the current state of the virtual machines 104 and clusters 120 within the cloud computing system (or that part of the cloud computing system for which it has responsibility). The controller component 184 analyzes the information from the monitor component 182 and formulates a plan for clustering the virtual machines according to security policy similarity. The modifier component 186 operates to change the current state to the new state, i.e., to organize the clusters based on the plan generated by the controller component 184.

Operation of the monitor component 182, the controller component 184, the modifier component 186 and the similarity and constraints policy component 188 will be described in more detail below.

The information gathered from the various virtual machines 104 generally relates to their security policies and security sensitivities. Similarities and sensitivities of a virtual machine can be codified and given a weight by the monitor component 182.

By weighting security sensitivities and policies of systems, they can be efficiently compared and evaluated to find similarities between them, thereby indicating similar security risks and mitigation approaches (e.g., security access rules).

Security policies may be defined for/by individual virtual machines to protect sensitive information and activities on the virtual machine. A security policy for a virtual machine may, for example, define permissions for as access to sensitive files, login methods, access times, etc. Security policies can also be used by supervisory agents, such as hypervisors, to manage devices in a distributed computing environment. Such supervisory security policies usually include a plurality of entries that define rules for what actions can be taken on defined target devices, and the authorized groups who can take those actions.

Rules in a security policy can be similar to one another if the nature of the restriction is the same. For example, two different rules can apply to the same command, but can have different parameters. Accordingly, a policy structure may be large, with repeating or similar rules, and may be very cumbersome to use in analytical tools. Examples of rules can include, without limitation, whether or not the root can login to the system, whether or not logins to the system are recorded, whether the policy is only in warning mode or is in restrictive mode, whether or not sensitive data access is controlled, etc.

In addition to organization of virtualization environments based on security policy, the security controller 180 may also make a recommendation to the virtualization environment manager 250 for where to locate virtual machines 104 based on the sensitivity level or type of virtual machine in question. For example, virtual machines can be organized based on whether they process sensitive data, such as credit card information, banking data, telecom information, etc.

A codified structure of security policy rules can be generated that can replace a security rules definition with a unique ID, parameters, occurrences, and location of the rules, which jointly define what is referred to herein as the "policy DNA."

Generation of the policy DNA for a security policy may be performed as follows. First, dedicated symbols, such as numbers, may be substituted for policy terms. A policy DNA generation tool can process a security policy and replace security policy terms with dedicated numbers (i.e. semantic substitution). As such, the codified structure can bind many semantically different rules that are created in different languages. For example, assuming a security policy definition language uses the term "allow access group machine1." This term can be replaced with a string, such as "1-3-4".

A semantic dictionary may be added to the policy header to define semantic rules used in generating the policy DNA. In particular embodiments, the portion of the dictionary that was codified in the substitution (dictionary of the number to strings/DSL replacement from the original language it was created in), may be added as a part of the DNA policy structure in XML format for usage by any potential interpreter engine. Example: <Allow access>1</Allow access><group>2</group><machine1>4</machine1>

For the codified policy rules, the occurrences of identical codified numbers may be counted, and the codified data may be de-duplicated using conventional data de-duplication techniques. Moreover, a count of the number of duplicate entries may be added. Example: "1-2-4-C1", "1-2-5-C2", "2-4-9-C1".

In some embodiments, the relative occurrence of codified rules may be determined so that a distribution of codified rules can be provided. For example, if a rule codified as 1-2-4 accounts for 25% of the entries in the policy DNA, a rule codified as 1-2-5 accounts for 50% of the entries in the policy DNA, and a rule codified as 2-4-9 accounts for 25% of the entries in the policy DNA, the following entries may be made in the policy DNA: "1-2-4-W25", "1-2-5-W50", "2-4-9-W25".

The codified policy may be sorted according to the stochastic distribution appearances (high count is first). Using the previous example, entries could be sorted in order as "1-2-5-W50", "1-2-4-W25", "2-4-9-W25".

A data structure, such as a unified long jagged array structure of the rules, may be created that forms the codified policy DNA, in order to reduce space. As will be understood by those skilled in the art, a jagged array is an array whose elements are themselves arrays.

A level of similarity between different policies may be calculated as follows.

Two codified jagged arrays may be compared in terms of:

[a] Content similarity (how many rows are identical, in percentage). Example: 8 out of 16 rows is 50%.

[b] Difference in the size of array. Example: 20 rows.

[c] Order of appearances of rows of the jagged structure— what is the largest distance from identical rows, in the 2 different strings. Example: 3.

One or more of these metrics may be used to compare similarity between two policies. For example, two perfectly identical policies (e.g. cloned polices) will have a metric of 100=100-0-0, indicating 100 percent identical rows, zero difference in size and zero distance between identical rows.

As another example, the difference between a full policy and an empty policy will be equal to 0-size of full policy1-size of full policy1.

The resulting number is referred to herein as the target function of the dual comparison.

The weighting and comparison of security policies can be controlled by a centralized comparison server which recommends where and how to implement and group particular virtual machines. A centralized comparison server may be used for overall planning of an entire virtualization environment, and/or for verification of the impact of a proposed change in the deployment of systems on the security state of existing virtual machines, as well as assisting in modifying the states and locations of the virtual machines.

Referring still to FIG. 3, the controller component 184 uses these weights to assign/reassign virtual machines to appropriate clusters 120 and/or virtualization environments 210. The controller component 184 may also ensure that without any further external changes to the system of clusters, the virtualization environments 210 and clusters 120 will reach a steady state at which no further reassignments are necessary.

The modifier component 186 may contact an automation manager 255 in the virtualization environment manager 250 or other services and provide a recommendation for how the automation manager 255 should assign/reassign virtual machines 104. This action causes the current state of assignments to change. When the state changes as a result of instructions by the modifier component 186 to the automation manager 255 or due to any external/internal cause, the monitor component 182 may reassess the current state of assignments, and the cycle may be repeated. This process may be repeated until a steady state is reached at which the controller component 184 has no more recommendations for assignment/reassignment of virtual machines.

The way that the controller component 184 decides which labels and weights of virtual machine security policies will trigger reassignment of virtual machines 104 to different clusters 120 or virtualization environments 210 may be based on a predetermined assignment policy that may be defined at the time the controller component 184 is configured. The assignment policy may be changed from time to time by an administrator of the security controller 180. The assignment policy itself can be adaptive in itself, and may have one or more variations that can be chosen based on the state of the computing environment.

Systems/methods according to some embodiments may organize virtual machines having similar sensitivity levels within the same cluster 120 or virtualization environment 210, by utilizing existing automation provisioning tools, such as the automation manager 255, that move the virtual machines 104 and organize the clusters 120 and virtualization environments 210 over time. In some embodiments, the decision regarding similarity (or lack of similarity) may be based on the security policy roles that exist on each virtual machine. In other embodiments, the decision regarding similarity may be based on a sensitivity level or security threat level assigned to a particular virtual machine. For example, a high sensitivity level may be assigned to virtual machines that process sensitive data, such as credit card data, while a low sensitivity level may be assigned to virtual machines that do not process such sensitive data.

Systems/methods according to some embodiments may thereby add security and threat sensitivity information and constraints to the virtual machine automation and provisioning tools, to make sure that virtual machines having the same or similar security sensitivity levels will co-exist and be deployed on the same cluster. This may help to ensure that security defined segmentations are maintained in addition to business and architecture constraints.

Referring still to FIG. 3, the security agent 170 in each virtual machine 104 computes a virtual machine sensitivity and security level (as a codified policy, for example), and sends this information to the monitor component 182 of a security controller 180 so that the information may be considered by the security controller 180 when it forms and/or updates security clusters. Accordingly, the monitor component 182 monitors the virtualization environment in which the virtual machines are contained, collects security and sensitivity levels from the virtual machines, and provides this information to the controller component 184, which forms security clusters based on the information.

The controller component 184 of the security controller 180 obtains information relating to the security policies of the virtual machines 104 within the virtualization environment 210, as well as sensitivity and location information from the monitor component 182. The controller component 184 determines if the virtual machines are currently being managed by the optimal hypervisor and/or grid from a security and sensitivity standpoint, and sends the information to the modifier component 186. The controller component 184 may verify that the virtual machines are currently managed by the optimal hypervisor based on whether the virtual machines match one another on similarity, and/or according to any other clustering algorithm, such as fuzzy logic, neural network, or grouping.

The modifier component 186 connects to the automation manager 255 in the virtualization environment manager 250 and suggests or requests location changes for the virtual machines that it may want to move based on the decisions of the controller component 184.

The similarity and constraints policy component 188 includes setting/configuration information to help form security clusters, including information such as constraints, proper similarity level, allowed actions (auto move, suggest, etc. . . . ) for each of the virtualization environments 210 it manages.

Figure 4:
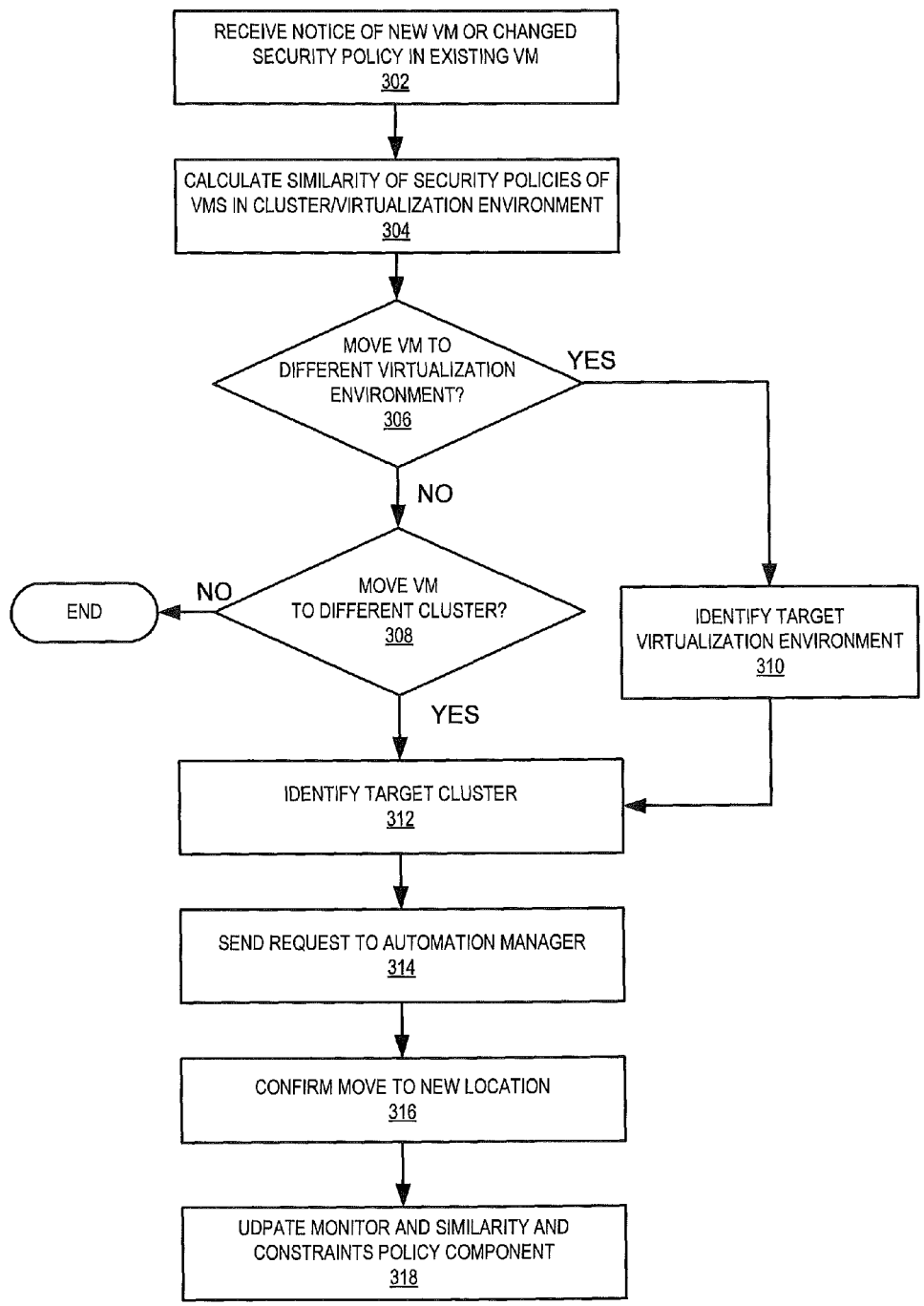
FIG. 4 is a flowchart illustrating systems/methods according to some embodiments.

Operations according to some embodiments are illustrated in the flowchart of FIG. 4. Referring to FIGS. 3 and 4, when the security policy of a virtual machine 104 changes, or when the virtualization environment manager 250 proposes to deploy a new virtual machine 104 in an existing virtualization environment 210, a notification is provided to the monitor component 182 of the security controller 180 (block 302) that is associated with the virtualization environment 210 in question. The notification may be provided by the virtualization environment manager 250 in the case of newly deployed virtual machines 104 or from the security agent of the new/changed virtual machine 104.

In response, the monitor component 182 of the security controller 180 may calculate a similarity of the security policies of the new/changed virtual machine and the other virtual machines in the cluster and/or virtualization environment in which the virtual machine is deployed or proposed to be deployed (block 304). This information is passed to the controller component 184, which determines based on the similarity of the security policy of the new/changed VM with the security policies of the remaining virtual machines whether or not the new/changed virtual machine should be moved to a different virtualization environment 210 (block 306).

If the controller component 184 determines, using a predetermined policy, that the new/changed virtual machine should be moved to a different virtualization environment 210, the controller component 184 may then attempt to identify an appropriate target virtualization environment to which the virtual machine should be moved, based, for example on the security policies of the virtual machines in the target virtualization environment (block 310). Operations then proceed to block 312 as described below.

If the controller component 184 determines in block 306 that the new/changed virtual machine 104 does not need to be moved to a different virtualization environment, the controller component 184 then determines if the virtual machine 104 needs to be moved to a different cluster within its existing virtualization environment (block 308). If not, operations terminate.

If the controller component 184 determines at block 308 that the virtual machine 104 needs to be moved to a different cluster within its existing virtualization environment, the controller component then identifies an appropriate target cluster to which the virtual machine should be moved, based, for example on the security policies of the virtual machines in the target cluster (block 312).

In response to the determination of the controller component, the modifier component 186 then sends a message to the automation manager 255 of the virtualization environment manager 250 requesting that the automation manager 255 redeploy the virtual machine into the target virtualization environment and cluster (block 314). The security controller 180 may then confirm that the virtual machine has been moved to the target virtualization environment and/or cluster (block 316) and updates the monitor component 182 and the similarity and constraints policy component accordingly (block 188).

Some embodiments may assist with identifying compliance breaches and with enforcement of compliance policies in a virtual computing environment. In case of mistaken provisioning, these systems/methods can ensure automatic migration, to protect against a mismatch of systems having different security policies.

Some embodiments may also provide self-adaptive clustering of virtual machines that can respond to dynamic changes in security levels. That is, it may not be sufficient to check during virtual machine setup that the virtual machines in the same environment have a sufficient security level for the environment, since policy and virtual machine usage may change. These systems/methods may constantly monitor the environment, and may automatically detect and adjust to changes in security policies of virtual machines within the environment.

Moreover, these systems/methods may enable an active/deployed production environment to be self-adjusting. This may improve the environment security level by having the virtual machines negotiate similarity with their hypervisor/cluster controller and/or with the security controllers of other virtual machines.

These systems/methods may also make active changes due to security modifications. A security sensitivity change in one virtual machine can trigger a change in another virtual machine, or a suggestion to move it to a more appropriate cluster or virtualization environment.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A server system, comprising:
a virtualization environment manager to manage a virtualization environment in which virtual machines can be deployed; and
a security controller that:
(i) receives security data corresponding to a candidate virtual machine that is proposed to be included in the virtualization environment,
(ii) compares security data corresponding to the candidate virtual machine to security data corresponding to other ones of the plurality of virtual machines in the virtualization environment that are managed by the virtualization environment manager, and (iii) in response to the comparison, transmits a message to the virtualization environment manager recommending that the candidate virtual machine should be excluded from the virtualization environment;

wherein at least one of the virtualization environment manager and the security controller is implemented in a computer processor;

wherein the security controller comprises a controller component that generates a metric in response to security data provided by the monitor component that compares the security data corresponding to the candidate virtual machine to the respective security data corresponding to each of the virtual machines in the virtualization environment; and wherein the security data comprises a security policy, and wherein the metric evaluates a difference between a first security policy and a second security policy based on (i) a number of identical entries in the first and second policies (ii) a difference in the sizes of the security policies, and/or (iii) a difference in order of appearance of entries in the first and second security policies.

2. The server system of claim 1, wherein the security controller comprises a monitor component to monitor the security data corresponding to the virtual machines in the virtualization environment.

3. The server system of claim 1, wherein controller component recommends excluding the candidate virtual machine from the virtualization environment when the security data corresponding to the candidate virtual machine differs from the security data corresponding to the remaining virtual machines in the virtualization environment by an average amount that is greater than a predefined threshold amount.

4. The server system of claim 1, wherein the controller component transmits a messages to the virtualization environment manager that recommends excluding the candidate virtual machine from the virtualization environment when the security data corresponding to the candidate virtual machine differs from the security data corresponding to any of the remaining virtual machines in the virtualization environment by an amount that is greater than a predefined threshold amount.

5. The server system of claim 1, wherein the candidate virtual machine is proposed to be included in the virtualization environment.

6. The server system of claim 1, wherein the candidate virtual machine comprises a virtual machine in the virtualization environment having a security policy that has changed.

7. The server system of claim 1, wherein the security controller compares the data corresponding to the candidate virtual machine to the security data corresponding to other virtual machines in a cluster defined in the virtualization environment, and in response to the comparison, recommends that the virtualization environment manager include the candidate virtual machine in the cluster or exclude the candidate virtual machine from the cluster.

8. The server system of claim 1, wherein the security controller identifies a target virtualization environment to which the candidate virtual machine can be moved in response to determining that the candidate virtual machine should be excluded from the virtualization environment.

9. The server system of claim 1, wherein the security data corresponding to the candidate virtual machine comprises a security policy and/or a sensitivity level of the candidate virtual machine.

10. A method, comprising:
receiving at a security controller security data corresponding to a candidate virtual machine that is proposed to be included in a virtualization environment managed by a virtualization environment manager, comparing the security data corresponding to the candidate virtual machine to security data corresponding to other virtual machines in the virtualization environment that are managed by the virtualization environment manager, and in response to the comparison, transmitting a message to the virtualization environment manager that recommends the candidate virtual machine be excluded from the virtualization environment;

wherein comparing the security data corresponding to the candidate virtual machine to the security data corresponding to other virtual machines in the virtualization environment comprises generating a metric that compares the security policy of the candidate virtual machine to the security policies of each of the virtual machines in the virtualization environment; and wherein the security data comprises a security policy, and wherein the metric evaluates a difference between a first security policy and a second security policy based on (i) a number of identical entries in the first and second security policies, (ii) a difference in the sizes of the first and second security policies, and/or (iii) a difference in order of appearance of entries in the first and second security policies.

11. The method of claim 10, wherein the security data corresponding to the candidate virtual machine comprises a security policy and/or a sensitivity level of the candidate virtual machine.

12. The method of claim 10, wherein the candidate virtual machine comprises a virtual machine that is proposed to be included in the virtualization environment.

13. The method of claim 10, wherein the candidate virtual machine comprises a virtual machine in the virtualization environment having a security policy that has changed.

14. The method of claim 10, further comprising recommending that the virtualization environment manager exclude the candidate virtual machine from the virtualization environment if the security data corresponding to the candidate virtual machine differs from the security data corresponding to the remaining virtual machines in the virtualization environment by an average amount that is greater than a predefined threshold amount.

15. The method of claim 10, further comprising recommending that the virtualization environment manager exclude the candidate virtual machine from the virtualization environment if the security data corresponding to the candidate virtual machine differs from the security data corresponding to any of the remaining virtual machines in the virtualization environment by an amount that is greater than a predefined threshold amount.

* * * * *